(12) United States Patent
Naffziger et al.

(10) Patent No.: US 6,509,788 B2
(45) Date of Patent: Jan. 21, 2003

(54) SYSTEM AND METHOD UTILIZING ON-CHIP VOLTAGE CONTROLLED FREQUENCY MODULATION TO MANAGE POWER CONSUMPTION

(75) Inventors: Samuel D. Naffziger, Ft. Collins, CO (US); Don D Josephson, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/811,255

(22) Filed: Mar. 16, 2001

(65) Prior Publication Data

US 2002/0140467 A1 Oct. 3, 2002

(51) Int. Cl.⁷ .............................................. H01J 19/82
(52) U.S. Cl. ...................................................... 327/548
(58) Field of Search ................................ 327/103, 113, 327/114, 291, 530, 534, 535, 536, 537, 548

(56) References Cited

U.S. PATENT DOCUMENTS

| | | | | |
|---|---|---|---|---|
| 4,539,490 A | * | 9/1985 | Arizumi et al. | 257/299 |
| 4,739,191 A | * | 4/1988 | Puar | 327/536 |
| 5,041,739 A | * | 8/1991 | Goto | 327/536 |
| 5,774,704 A | | 6/1998 | Williams | |
| 5,789,952 A | | 8/1998 | Yap et al. | |
| 5,835,434 A | * | 11/1998 | Hirayama | 327/534 |

FOREIGN PATENT DOCUMENTS

EP       1030449 A1    8/2000

OTHER PUBLICATIONS

Burd, Thomas et., "A Dynamic Voltage Scaled Microprocessor System", Journal of Solid State Circuits vol. 35, No. 11, Nov. 2000, pp. 1571–1580.

Klaider, Alexander, "The Technology Behind Crusoe Processors", (Transmeta Corporation) printed from website hppt://www.transmeta.com/crusoe/download/whitepapers, pp. 1–18.

Ang, Michael et al., "An On–Chip Voltage Regulator Using Switched Decoupling Capacitors", ISSCC 2000 paper 26.7, pp. 438–439.

* cited by examiner

Primary Examiner—Jeffrey Zweizig

(57) ABSTRACT

A system and method are disclosed which utilize an on-chip oscillator to provide the appropriate clock frequency for components of the chip to manage power consumption by the chip. More specifically, in a preferred embodiment of the present invention, an on-chip oscillator is utilized to provide the clock frequency for the chip's core circuitry, and such oscillator can dynamically adjust such clock frequency to manage the chip's power consumption. Thus, such on-chip oscillator generates the processor clock instead of the usual synchronous, externally controlled clock generator. A preferred embodiment of the present invention utilizes a voltage controlled frequency oscillator to control the chip's clock frequency in order to dynamically manage power consumption by the chip. Such oscillator is preferably operable to adjust its output frequency based on the voltage supplied to such oscillator to effectively manage the chip's power consumption.

29 Claims, 2 Drawing Sheets

SYSTEM AND METHOD UTILIZING ON-CHIP VOLTAGE CONTROLLED FREQUENCY MODULATION TO MANAGE POWER CONSUMPTION

RELATED APPLICATIONS

This application is related to co-pending and commonly assigned U.S. patent application Ser. No. 09/811,243, filed Mar. 16, 2001, entitled "SYSTEM AND METHOD UTILIZING ON-CHIP VOLTAGE MONITORING TO MANAGE POWER CONSUMPTION", the disclosure of which is hereby incorporated herein by reference.

TECHNICAL FIELD

This invention relates in general to management of power consumption by an integrated circuit, and in specific to a system and method that utilize an on-chip voltage controlled oscillator to dynamically generate an appropriate clock frequency for the chip based on the voltage being drawn by the chip.

BACKGROUND

Integrated circuits (commonly referred to as "chips"), such as microprocessors, are utilized in an ever-increasing number of various applications. For instance, such chips are commonly implemented not only in personal computers (PCs) and laptops, but are typically implemented in much smaller (and more portable) devices, such as personal digital assistants (PDAs), cellular telephones, pagers, and various other types of devices. Considering the number of tasks that such chips are relied upon to perform, the desire for fast processing speeds (to allow tasks to be performed quickly), and the desire for limited power consumption by such chips, chip designers are faced with the difficult task of designing chips that achieve the desired performance (e.g., fast processing speed), while managing the power consumption of the chips. Given the ever-increasing advances being made in performance of chips, such as microprocessors, power consumption is becoming a serious concern. For example, power consumption is becoming a serious performance limiter for high speed microprocessors. For instance, a key design objective for microprocessor systems is providing the highest possible peak performance for compute-intensive code, while reducing power consumption of the microprocessor system. Particularly when such microprocessor systems are to be implemented within portable electronic devices, reduction in power consumption (at least during low performance periods) is desirable to maximize the battery life of the device.

As is well known, power consumption of a chip may be generally computed utilizing the following equation: $P=C*V^2*F$, wherein P represents power consumption, C represents switching capacitance, V represents operating voltage, and F represents the clock frequency of the chip. In view of such equation, it should be understood that switching capacitance (C), voltage (V), and frequency (F) are all factors in determining the power consumption (P) of a chip. In many cases, it is necessary to limit processor frequency (F) in order to hold the power consumption (P) of a chip below a certain level that is acceptable for use in a given system (e.g., within a desktop or portable devices).

Microprocessor chips of the prior art have typically been implemented with a fixed voltage and frequency determined to prevent the chip from consuming more than a particular amount of power. Typically, in designing prior art microprocessor chips, a designer tests the chip with software code for creating a heavy computational load on the chip in order to determine the appropriate voltage and frequency that may be implemented for the chip such that its power consumption does not exceed a particular amount when heavy computational loads are encountered by the chip. However, once implemented, such heavy computational loads may be encountered relatively seldom, with low (or no) computational load being placed on the microprocessor much of the time. Accordingly, the worst case computational loads dictate the voltage and frequency of the chip, thereby hindering performance of the chip (e.g., because of the decreased frequency required for the worst case).

Another common power-saving technique of the prior art attempts to reduce only the clock frequency (F) during non-compute intensive activity. This reduces power, but does not affect the total energy consumed per process. That is, a reduction in frequency (F) results in a linear reduction in the power consumed, but also results in a linear increase in task run-time, which causes the energy-per-task to remain constant. On the other hand, reducing only the voltage (V) of the processor improves its energy efficiency, but compromises its peak performance. It has been recognized in the prior art that if clock frequency (F) and supply voltage (V) are dynamically varied in response to computational load demands, then energy consumed per process can be reduced for the low computational periods, while retaining peak performance when required (i.e., for heavy computational periods). Design strategies attempting to utilize such dynamic variation of clock frequency (F) and supply voltage (V) based on computational loads are commonly referred to as dynamic voltage scaling (DVS).

One implementation proposed in the prior art utilizes DVS on a microprocessor under direct Operating System (OS) control. In such an implementation, one or more voltage scheduler algorithms are required in the OS of a DVS system, which are utilized to dynamically adjust the processor speed and voltage at run-time of a microprocessor. The voltage schedulers control the clock frequency (F) and supply voltage (V) of a microprocessor by writing a desired frequency (in MHz) to a coprocessor register. The voltage schedulers analyze the current and past state of the system in order to predict the future workload of the processor. For example, individual applications supply a completion deadline, and the voltage scheduler uses the applications' previous execution history to determine the number of processor cycles required and sets the clock frequency (F) accordingly. Interval-based voltage schedulers have been proposed in the prior art, which periodically analyze system utilization to control the frequency and voltage. As an example, if the voltage scheduler determines that the preceding time interval was greater than 50% active, it may increase the frequency and voltage for the next time interval. Thus, the system attempts to preserve the amount of power consumed by a microprocessor by having the OS dynamically adjust the clock frequency (F) to the minimum level required by the current active processes. Such an implementation that utilizes voltage scheduler algorithms (i.e., software) in the OS to dynamically control the voltage and frequency of a microprocessor is described in greater detail in *A Dynamic Voltage Scaled Microprocessor System*, by Thomas Burd, Trevor Pering, Anthony Sratakos, and Robert Brodersen, published in *Journal of Solid State Circuits* Vol. 35, No. 11, November 2000, and *The Technology Behind Crusoe™ Processors*, by Alexander Klaiber (Transmeta Corporation), available (as of the filing of this application) at http://www.transmeta.com/crusoe/download/pdf/ crusoetechwp.pdf, the disclosures of which are hereby incorporated herein by reference.

However, such an approach that utilizes the OS to dynamically control the voltage and frequency of a microprocessor is often problematic/undesirable. First, changing a system's OS to implement such an approach is typically very time consuming and/or costly. System administrators generally dislike upgrading their OS to improve their hardware. Additionally, the OS approach is not perfectly reliable because it has imperfect information about how much power the chip is actually consuming and what its compute needs are. Rather, the OS can only attempt to estimate/guess what is needed at the chip level. Furthermore, data necessary for the OS to intelligently estimate the power consumption and/or compute needs of a chip is typically chip specific, which results in greater difficulty in implementing/upgrading such an OS approach (because the OS implementation must be tailored to a specific chip technology that is implemented).

Yet another power-saving technique implemented in prior art microprocessor chips involves regulating the voltage of the on-chip power supply to reduce voltage droops, thereby allowing for higher clock frequency. More specifically, this technique attempts to improve the integrity of the on-chip power supply by regulating it carefully so that the average voltage to the chip can be reduced (i.e., because sudden changes in power consumption tend to cause the voltage to droop below average). By reducing the droops through voltage regulation, the average voltage on the chip can be reduced by the magnitude of such droop reduction with no frequency reduction, and such reduction in average voltage results in reduced power consumption by the chip. Such an implementation that improves the integrity of the on-chip power supply to reduce voltage droops of a microprocessor is described in greater detail in *An On-chip Voltage Regulator using Switched Decoupling Capacitors*, by Michael Ang, Raoul Salem, and Alexander Taylor, published in *ISSCC* 2000 Paper 26.7, the disclosure of which is hereby incorporated herein by reference.

Such prior art techniques generally aid in improving power integrity. However, such prior art techniques for improving power integrity attempt to supply extra current to a chip during high activity periods, thereby failing to actually reduce power consumption. Further, the additional current supplied during such periods is necessarily limited in supply by the quantity of capacitance.

In view of the prior art, a desire exists for a method and system for better managing power consumption of a chip. More particularly, a desire exists for a method and system for more accurately managing power consumption based on more exact information of chips' power consumption and compute needs. Furthermore, a desire exists for a method and system for managing power consumption that does not require software changes and is transparent to the OS.

BRIEF DESCRIPTION OF THE DRAWING

For a more complete understanding of the present invention, reference is now made to the following descriptions taken in conjunction with the accompanying drawing, in which.

SUMMARY OF THE INVENTION

Figure 1:
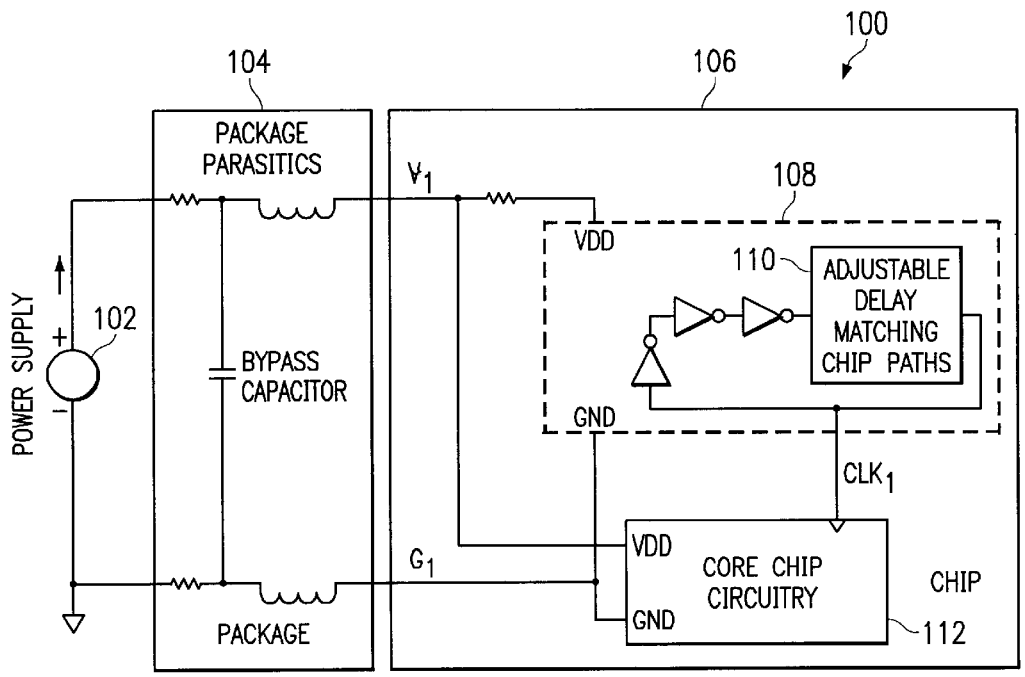
FIG. 1 shows a preferred embodiment of the present invention which utilizes an on-chip voltage controlled oscillator to dynamically adjust the frequency of the chip's clock to manage the power consumption of the chip.

The present invention is directed to a system and method which utilize an on-chip oscillator to provide the appropriate clock frequency for components of the chip to manage power consumption by the chip. More specifically, in a preferred embodiment of the present invention, an on-chip oscillator is utilized to provide the clock frequency for the chip's core circuitry, and such oscillator can dynamically adjust such clock frequency to manage the chip's power consumption. Thus, such on-chip oscillator generates the processor clock instead of the usual synchronous, externally controlled clock generator. A preferred embodiment of the present invention utilizes a voltage controlled frequency oscillator matched to the speed of on-chip paths to control the chip's frequency in order to dynamically manage power consumption by the chip. Such oscillator is preferably operable to adjust its output frequency (i.e., the frequency of the chip's clock) based on the voltage supplied to such oscillator. For example, as the voltage supplied to the oscillator increases, the output frequency increases. Accordingly, the voltage controlled oscillator of a preferred embodiment allows the frequency to be dynamically adjusted in response to the voltage being drawn by the chip to effectively manage the chip's power consumption.

In a most preferred embodiment, the voltage controlled oscillator allows for a self-regulating chip. That is, the voltage controlled oscillator of a most preferred embodiment is controlled by the same voltage as the core of the chip (e.g., the microprocessor), and therefore upon a voltage droop occurring in the core circuitry of the chip, the voltage droop is also received by the oscillator, resulting in the oscillator decreasing its output frequency. More specifically, in a most preferred embodiment, a current-limited power supply is utilized such that extended use of power beyond the limit produces a voltage droop. The voltage droop then slows the oscillator (hence the chip frequency) and results in reduced power consumption by $1/(V^2 * F)$. Thus, a preferred embodiment achieves a cubic reduction in power with simultaneous voltage and frequency reduction.

In an alternative embodiment, a sensor (e.g., a thermal or voltage sensor) is utilized to detect power consumption beyond the target, and upon such sensor detecting that the power consumption is beyond the target it may trigger a control process (e.g., control circuitry) to reduce the oscillator frequency until proper conditions are restored. For instance, such control circuitry may control the voltage supplied to the voltage controlled oscillator, thereby controlling the output frequency of the oscillator to manage power consumption. For instance, the control circuitry may maintain the voltage input to the on-chip oscillator at a first value "X" until it is determined by a sensor (e.g., a voltage sensor) that the value of the voltage input to the chip's core circuitry achieves a threshold value "T," and upon such voltage achieving the threshold value "T" the control circuitry may adjust the value of the voltage input to the oscillator to a second value "Y" to cause its output frequency to be dynamically adjusted.

It should be recognized that in a preferred embodiment, upon a reduced voltage being encountered by a chip, which may be caused by sustained high power activity on the chip (or specific voltage management techniques introduced by the current source), as examples, a preferred embodiment dynamically reduces the chip frequency just enough to keep the chip functional at such reduced voltage. More specifically, as the chip's core circuitry draws more current, thereby reducing the voltage input to the on-chip oscillator, the frequency output by such oscillator decreases. On the other hand, as the chip's core circuitry draws less current, thereby increasing the voltage available to the on-chip oscillator, the frequency output by such oscillator increases.

It should be recognized that a preferred embodiment provides a seamless and fine-grained approach to getting the most performance per Watt. For example, a preferred embodiment allows for the highest processing speed (or fastest clock frequency) that is possible while remaining within a desired power consumption to be utilized. For instance, the chip's clock frequency can dynamically adjust such that its frequency is consistently at the fastest frequency possible to remain within the desired power consumption. Thus, very little (or no) guard banding is needed, and the chip is not required to be designed with its clock frequency limited to the worst case computing intensity that may be encountered by the chip.

It should also be recognized that a preferred embodiment provides a simple means of tying performance to power. That is, a preferred embodiment provides a relatively simple way for linking the performance of a chip to its power consumption, in a dynamic manner. For example, activating an increased number of power hungry units on the chip will incur a frequency penalty to manage the chip's power consumption. Due to the cubic reduction in power achieved with a simultaneous frequency and voltage reduction (recall $P=C*V^2*F$), the power/performance tradeoff is much better than coarse, functional methods such as throttling units or disabling ports. It should also be recognized that a preferred embodiment enables elimination of the PLL (phase locked loop) commonly required in prior art microprocessor designs, which is typically very difficult to design.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Turning to FIG. 1, a portion of a system 100 which implements a preferred embodiment of the present invention is shown. As shown, power supply 102 supplies power to a chip 106. More specifically, a voltage signal and ground signal is supplied by power supply 102, which is typically fed through some package parasitics 104 to chip 106. Such package parasitics 104 are well known to those of ordinary skill in the computer arts, and therefore will not be described in great detail herein. Thus, the resulting voltage signal $V_1$ and ground signal $G_1$ are received by chip 106. Chip 106 comprises a voltage controlled frequency oscillator 108, which generates chip clock $CLK_1$ that is utilized as the clock signal for the core chip circuitry 112. It should be understood that chip 106 may be any type of integrated circuit, including without limitation a microprocessor. Core chip circuitry 112 may include any clocked circuitry components of chip 106, such as logic to execute instructions in a microprocessor, storage elements for information the chip may utilize for performing operations, arithmetic processing logic, etcetera.

As shown in FIG. 1, in a preferred embodiment, the received voltage signal $V_1$ and ground signal $G_1$ are fed both to core chip circuitry 112 and oscillator 108. In such preferred embodiment, oscillator 108 adjusts the frequency of clock $CLK_1$ generated thereby based on the value of voltage $V_1$. More particularly, oscillator 108 is most preferably a ring oscillator (which includes a loop with an odd number of inversions), and such ring oscillators are well known in the art. Most preferably, circuitry 110, which is well known to those of ordinary skill in the art, is included in oscillator 108 to adjust the frequency of $CLK_1$ based on the value of voltage $V_1$. Such circuitry 110 may include any switched capacitive or resistive elements that effect the loop delay of ring oscillator 108, and because such elements are generally well known in the art, they are not described in greater detail herein.

For instance, as voltage $V_1$ decreases, the frequency of $CLK_1$ output by oscillator 108 decreases. As a result, voltage controlled oscillator 108 of a preferred embodiment allows for chip 106 to self-regulate its power consumption. It will be recalled that the power consumption of chip 106 may be computed utilizing the equation $P=C*V^2*F$, wherein P represents power consumption, C represents switching capacitance, V represents operating voltage (e.g., voltage $V_1$), and F represents the clock frequency of chip 106 (e.g., frequency of $CLK_1$). Thus, by oscillator 108 dynamically adjusting the clock frequency of chip 106 (i.e., the frequency of $CLK_1$) in response to changes in the voltage $V_1$, the chip may self-regulate its power consumption.

Figure 2:
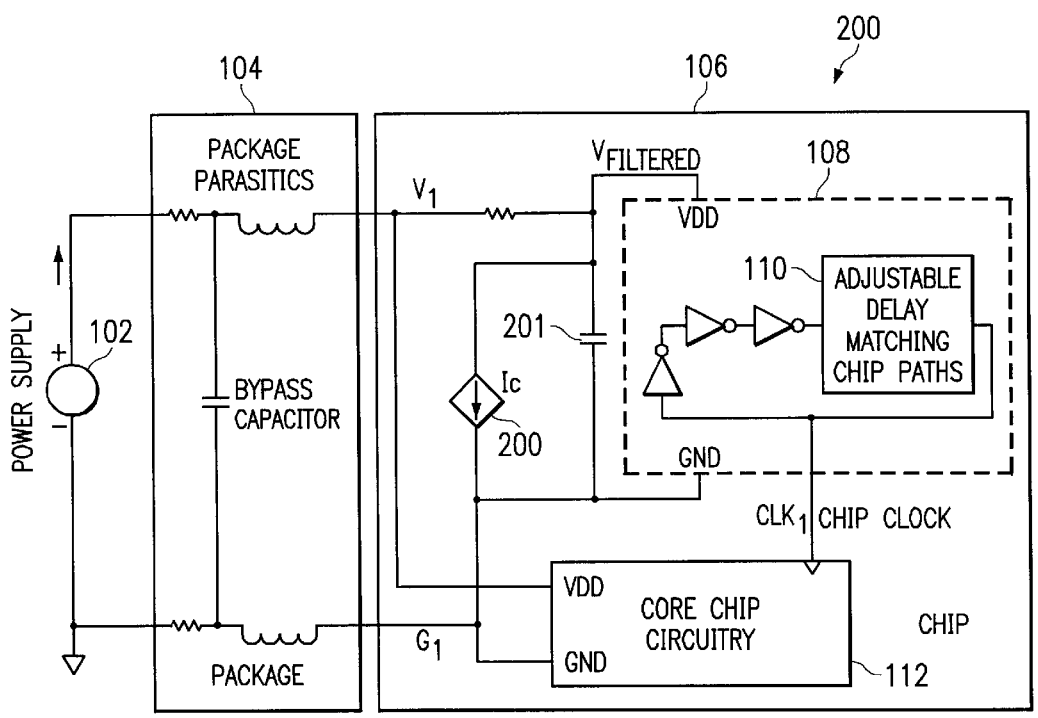
FIG. 2 shows an alternative embodiment of the present invention which includes circuitry for controlling the voltage input to the on-chip voltage controlled oscillator to allow for the frequency of the chip's clock output by such oscillator to be controlled in a desired manner.

Turning to FIG. 2, an alternative embodiment that is similar to the preferred embodiment of FIG. 1 is shown, wherein like reference numbers are used to identify like components. More specifically, a portion of a system 200 which implements such an alternative embodiment of the present invention is shown. As with the preferred embodiment of FIG. 1, power supply 102 supplies power to a chip 106. More specifically, a voltage signal and ground signal is supplied by power supply 102, which is typically fed through package parasitics 104 to chip 106. As described above with reference to FIG. 1, the resulting voltage signal $V_1$ and ground signal $G_1$ are received by chip 106.

Chip 106 comprises voltage controlled frequency oscillator 108, which generates chip clock $CLK_1$ that is utilized as the clock signal for the core chip circuitry 112. Core chip circuitry 112 may include any clocked circuitry components of chip 106, as described above with reference to FIG. 1. The received voltage signal $V_1$ and ground signal $G_1$ are fed both to core chip circuitry 112 and oscillator 108. As shown in FIG. 2, capacitor 201 is included, which acts as a charge reservoir in that charge not consumed by the chip circuitry during low power periods can be stored away to be delivered to the chip during bursts of high power activity. This enables burst of high power (and high performance) activity to be sustained for some predetermined period of time before the voltage droops (i.e., when capacitor 201 is depleted of charge) and the chip self-throttles its power consumption and hence slows down. Of course, it should be understood that such a capacitor 201 may likewise be implemented in the embodiment of FIG. 1, even though it is not shown or described therewith.

Additionally, in this alternative embodiment, control circuitry 200 is included on chip 106. Such control circuitry 200 is capable of controlling the voltage supplied to oscillator 108, thereby controlling the frequency of the output clock signal $CLK_1$. For example, sensor(s), such as a voltage sensor and/or thermal sensor, may be utilized to monitor the voltage level drawn by core circuitry 112, and may communicate such voltage level to control circuitry 200. In turn, control circuitry 200 may control the voltage input to oscillator 108, thereby dynamically controlling the output frequency of oscillator 108 (i.e., the frequency of $CLK_1$) to manage the chip's power consumption. It should be understood that control circuitry 200 may be implemented on chip 106 with software executing thereon for managing the chip's power consumption (e.g., may be implemented as firmware).

Thus, control circuitry 200 allows for voltage controlled oscillator 108 to be utilized to manage the power consumption of chip 106 without necessarily requiring the identical voltage $V_1$ supplied to the core chip circuitry 112 to always be input to oscillator 108. For example, circuitry (e.g., sensors) may be included for monitoring the value of voltage $V_1$, and such circuitry may cause control circuitry 200 to adjust the voltage supplied to oscillator 108 only upon the value of voltage $V_1$ achieving a particular threshold level. For instance, control circuitry 200 may maintain the voltage input to oscillator 108 at a first value "X" until it is determined by circuitry (not shown) that monitors the value of the voltage $V_1$ input to chip 106 that such value achieves a threshold value "T," and upon voltage $V_1$ achieving such threshold value "T" control circuitry 200 may adjust the value of the voltage input to oscillator 108 to a second value "Y," which may be the value of voltage $V_1$. Thus, by oscillator 108 dynamically adjusting the clock frequency of chip 106 (i.e., the frequency of $CLK_1$) in response to the voltage value supplied to oscillator 108 as controlled by control circuitry 200, chip 106 may self-regulate its power consumption.

Figure 3:
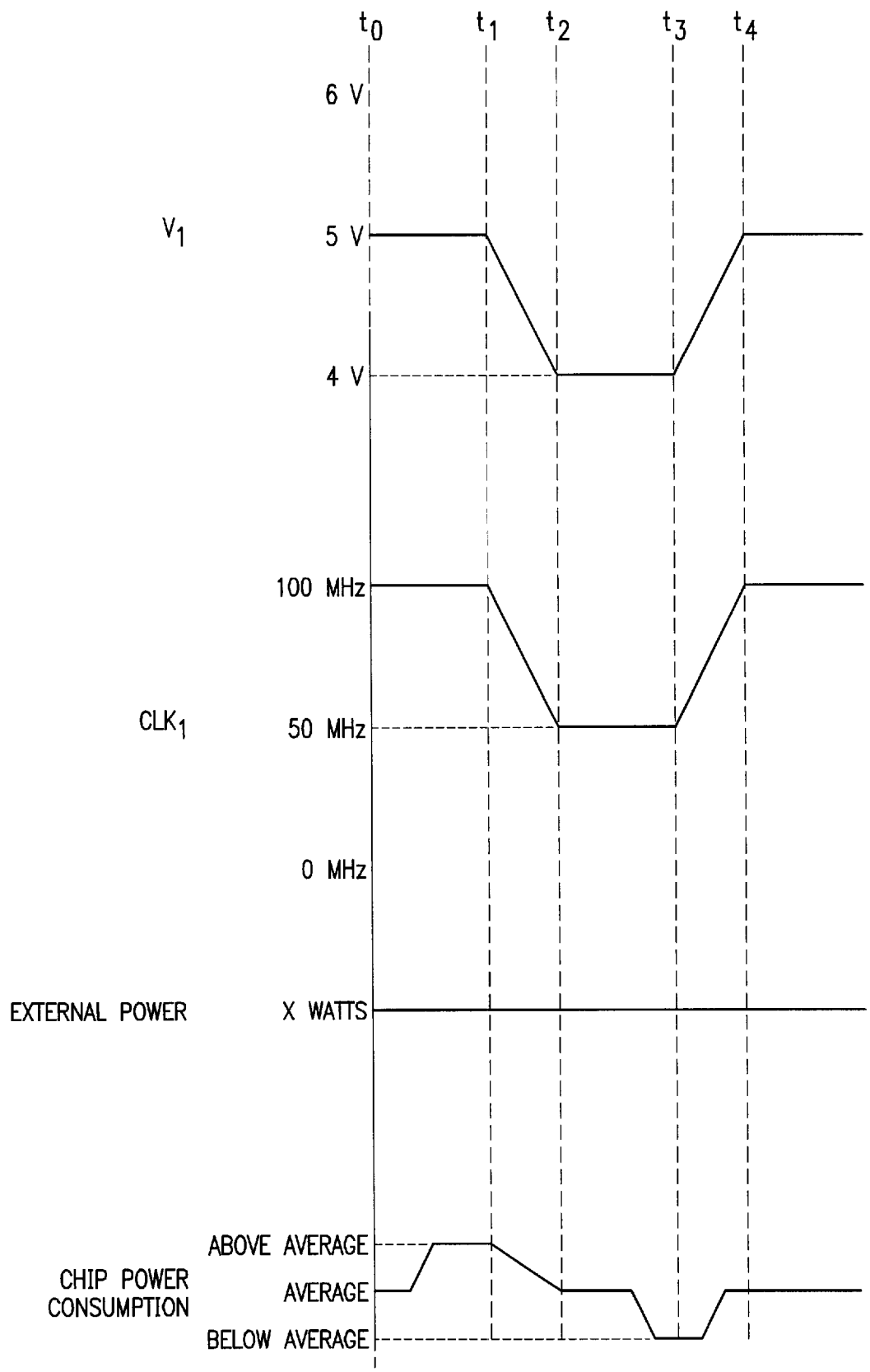
FIG. 3 shows exemplary wave forms that illustrate the operation of a preferred embodiment.

Turning now to FIG. 3, exemplary wave forms are shown that illustrate operation of a preferred embodiment. More specifically, an exemplary wave form is shown for voltage $V_1$ input to chip 106, clock $CLK_1$ generated by oscillator 108, external power distributed to chip 106, and instantaneous chip power consumption. As shown, at time $t_0$, voltage $V_1$ is 5 volts (V) and the frequency of clock $CLK_1$ is 100 megahertz (MHz), resulting in a desired value of "X" watts of external power required to be distributed to chip 106. As the example of FIG. 3 illustrates, in a most preferred embodiment, the external power distributed to chip 106 remains relatively constant, while the instantaneous chip power consumption may vary significantly over time. For instance, at time $t_0$ the chip power consumption is at its average value. Some time later, between time $t_0$ and time $t_1$, the instantaneous chip power consumption goes above average (e.g., compute intensive operation may be performed by the core circuitry, thus causing the instantaneous chip power consumption to increase above average). When the chip power goes above average power, capacitor 201 starts draining charge to supply the chip, in a most preferred embodiment. Thus, as the example of FIG. 3 shows, voltage $V_1$, frequency of $CLK_1$, and the external power distributed to chip 106 remain relatively constant from the time that the chip power increases above average until time $t_1$ (because capacitor 201 drains its charge to supply the chip the additional needed power).

Over time, if the chip power consumption remains above average, the charge will drain from capacitor 201 and voltage $V_1$ will droop, resulting in the chip power being reduced to the average value. For example, at time $t_1$, capacitor 201 is still supplying the necessary power to enable voltage $V_1$ to remain at 5V. Further, the frequency of clock $CLK_1$ output by oscillator 108 remains 100 MHz, with external power distributed to chip 106 remaining at a desired value "X" watts. From time $t_1$ to time $t_2$, voltage $V_1$ droops from 5V to 4V (e.g., as the charge is drained from capacitor 201), and in response the frequency of clock $CLK_1$ output by oscillator 108 gradually decreases from 100 MHz to 50 MHz to maintain the external power distributed to chip 106 substantially at the desired "X" watts. As further shown in the example of FIG. 3, the decrease in voltage $V_1$ and frequency of $CLK_1$ results in a decrease in the instantaneous chip power consumption (back to its average). From time $t_2$ to time $t_3$ voltage $V_1$ remains at 4V, and in response the frequency of clock $CLK_1$ output by oscillator 108 remains at 50 MHz, thereby maintaining the instantaneous chip power consumption of chip 106 substantially at its average, while the external power required by chip 106 remains at the desired "X" watts.

Some time after time $t_2$, the instantaneous power chip consumption decreases below its average (e.g., as the compute intensive operation is completed). Thus, in response, from time $t_3$ to time $t_4$, voltage $V_1$ gradually increases from 4V back to 5V, and in response the frequency of clock $CLK_1$ output by oscillator 108 gradually increases from 50 MHz to 100 MHz. Accordingly, as the value of voltage $V_1$ increases, the frequency of clock $CLK_1$ output by oscillator 108 increases, thereby allowing faster operation of the core circuitry 112 of chip 106 without requiring an increase in external power distributed to chip 106. It should be recognized that in a most preferred embodiment, the external power distributed to chip 106 remains relatively constant (i.e., at the desired "X" Watts) while the chip power consumption is below average to enable power to be stored away in the form of charge on capacitor 201 (e.g., to replenish the charge of capacitor 201). As voltage $V_1$ and the frequency of $CLK_1$ increase, the instantaneous chip power consumption returns to its average. After time $t_4$, chip power consumption remains substantially at its average, and thus, voltage $V_1$ remains at 5V. In response to voltage $V_1$ remaining at 5V, the frequency of clock $CLK_1$ output by oscillator 108 remains at 100 MHz, thereby maintaining the external power required to be distributed to chip 106 at the desired "X" watts.

As shown in the example of FIG. 3, a preferred embodiment utilizes on-chip oscillator 108 to dynamically generate clock frequency $CLK_1$ for the core circuitry 112 of chip 106 responsive to voltage $V_1$ in order to manage the power consumption of chip 106. Accordingly, it should be recognized that a preferred embodiment provides a seamless and fine-grained approach to getting the most performance per Watt. For example, a preferred embodiment allows for operation at the highest processing speed (or fastest clock frequency) that is possible while remaining within a desired power consumption. For instance, the chip's clock frequency supplied by on-chip oscillator 108 can dynamically adjust such that it is consistently at the fastest frequency possible to remain within the desired power consumption.

It should be recognized that in a preferred embodiment, upon a reduced voltage being encountered by a chip, which may be caused by sustained high power activity on the chip (or specific voltage management techniques introduced by current source 200), as examples, a preferred embodiment dynamically reduces the chip frequency (e.g., $CLK_1$) just enough to keep the chip functional at such reduced voltage (which is the responsibility of oscillator 108). More specifically, as the chip's core circuitry 112 draws more current, thereby reducing the voltage input to oscillator 108, the frequency of $CLK_1$ output by such oscillator 108 decreases. On the other hand, as the chip's core circuitry 112 draws less current, thereby increasing the voltage available to the oscillator, the frequency of $CLK_1$ output by such oscillator 108 increases.

It should also be recognized that a preferred embodiment provides a simple means of tying performance to power. That is, a preferred embodiment provides a relatively simple way for linking the clock frequency of a chip to its power consumption, in a dynamic manner. For example, suppose an increased number of power hungry units (or components) are suddenly activated on chip 106. A preferred embodiment enables chip 106 to dynamically respond to such increased number of activated units by decreasing the clock frequency generated by oscillator 108 to manage the chip's power consumption. Furthermore, due to the cubic reduction in power achieved with a simultaneous frequency and voltage reduction (recall $P=C*V^2*F$), the power/performance tradeoff is much better than coarse, functional methods such as throttling units or disabling ports.

It should also be recognized that a preferred embodiment enables elimination of the PLL (phase locked loop) commonly required in prior art microprocessor designs, which is typically very difficult to design. That is, implementation of on-chip oscillator 108 to generate the clock for the chip's core circuitry, a PLL is not required to be implemented in a preferred embodiment, which may aid in simplifying the design of a chip.

Furthermore, it should be understood that the embodiments of the present invention for managing power consumption within a chip may be implemented within any type of integrated circuit, and any such implementation is intended to be within the scope of the present invention. As examples, embodiments of the present invention may be implemented within such integrated circuits as microprocessors, embedded controllers, network routers, graphics processors, and any other application specific integrated circuits (ASICs). Although, a most preferred implementation is utilized within a microprocessor chip.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing power consumption on an integrated circuit, said method comprising:
   supplying voltage to said integrated circuit;
   utilizing an oscillator included on said integrated circuit to generate a clock signal to be utilized by said integrated circuit; and
   dynamically adjusting the clock signal's frequency in response to changes in voltage supplied to said integrated circuit to manage power consumption of said integrated circuit.

2. The method of claim 1 further comprising:
   supplying a common voltage to said oscillator and to core circuitry of said integrated circuit.

3. The method of claim 1 wherein said voltage is supplied to both said oscillator and to core circuitry of said integrated circuit.

4. The method of claim 1 wherein said dynamically adjusting the clock signal's frequency in response to changes in voltage required by said integrated circuit includes:
   decreasing said clock signal's frequency in response to a decrease in said voltage supplied to said integrated circuit.

5. The method of claim 4 wherein said decreasing further includes:
   decreasing said clock signal's frequency to a speed that results in power delivered to said integrated circuit remaining relatively constant.

6. The method of claim 1 wherein said dynamically adjusting the clock signal's frequency in response to changes in voltage supplied to said integrated circuit includes:
   increasing said clock signal's frequency in response to an increase in said voltage supplied to said integrated circuit.

7. The method of claim 6 wherein said increasing further includes:
   increasing said clock signal's frequency to a speed that results in power delivered to said integrated circuit remaining relatively constant.

8. The method of claim 1 further comprising:
   utilizing control circuitry included on said integrated circuit to control the voltage supplied to said oscillator.

9. The method of claim 1 wherein said clock signal is used for timing purposes by clocked circuitry of said integrated circuit.

10. The method of claim 1 wherein said step of dynamically adjusting the clock signal's frequency in response to changes in voltage supplied to said integrated circuit to manage power consumption of said integrated circuit comprises:
    decreasing the clock signal's frequency during high computational loads encountered by said integrated circuit; and
    increasing the clock signal's frequency during low computational loads encountered by said integrated circuit.

11. The method of claim 1 wherein said dynamically adjusting the clock signal's frequency to manage power consumption comprises:
    dynamically adjusting the clock signal's frequency in response to said changes in voltage supplied to said integrated circuit to maintain said integrated circuit's power consumption within a predetermined range.

12. The method of claim 1 wherein said dynamically adjusting the clock signal's frequency to manage power consumption comprises:

dynamically adjusting the clock signal's frequency in response to said changes in voltage supplied to said integrated circuit to maintain said integrated circuit's power consumption at a constant level.

13. The method of claim 1 wherein said changes in voltage are instigated to manage power consumption of said integrated circuit.

14. The method of claim 1 wherein said integrated circuit further comprises core circuitry that uses said clock signal, and wherein said changes in voltage are instigated by said core circuitry.

15. An integrated circuit comprising:

core circuitry; and oscillator that outputs a clock signal that is utilized for timing purposes by said core circuitry, wherein said clock signal is dynamically adjustable to manage power consumption of said integrated circuit.

16. The integrated circuit of claim 15 wherein said integrated circuit is selected from the group consisting of: microprocessor, embedded controller, network router, graphics processor, and any other application specific integrated circuit (ASIC).

17. The integrated circuit of claim 15 wherein said oscillator is a ring oscillator.

18. The integrated circuit of claim 15 wherein said oscillator is a voltage controlled oscillator that outputs said clock signal having a frequency that is dependent on a voltage supplied to said oscillator.

19. The integrated circuit of claim 18 wherein common voltage is supplied to said oscillator and said core circuitry.

20. The integrated circuit of claim 15 wherein said oscillator is operable to dynamically adjust the frequency of said clock signal responsive to the amount of voltage supplied to said core circuitry.

21. The integrated circuit of claim 20 wherein said oscillator is operable to increase the clock signal's frequency in response to an increase in said voltage supplied to said core circuitry, and wherein said oscillator is operable to decrease the clock signal's frequency in response to a decrease in said voltage supplied to said core circuitry.

22. The integrated circuit of claim 21 wherein said oscillator is operable to dynamically adjust the clock signal's frequency to a speed that results in power delivered to said integrated circuit remaining relatively constant.

23. The integrated circuit of claim 15 wherein said oscillator is operable to decrease the frequency of said clock signal during high computational loads encountered by said core circuitry and increase the frequency of said clock signal during low computational loads encountered by said core circuitry.

24. A system comprising:

integrated circuit that includes an oscillator and core circuitry;

power supply for supplying voltage to said integrated circuit; and wherein said oscillator outputs a clock frequency that is utilized by said core circuitry, and wherein said oscillator is operable to dynamically adjust said clock frequency responsive to voltage being consumed by said integrated circuit to manage power consumption of said integrated circuit.

25. The system of claim 24 wherein said oscillator is a voltage controlled oscillator that outputs said clock signal having a frequency that is dependent on a voltage supplied to said oscillator.

26. The system of claim 25 wherein common voltage is supplied to said oscillator and said core circuitry.

27. The system of claim 24 wherein said oscillator is operable to increase said clock frequency in response to an increase in said voltage being consumed by said integrated circuit, and wherein said oscillator is operable to decrease said clock frequency in response to a decrease in said voltage being consumed by said integrated circuit.

28. The system of claim 24 wherein said clock frequency is utilized for timing purposes by said core circuitry.

29. The system of claim 24 wherein said oscillator is operable to decrease said clock frequency during high computational loads encountered by said core circuitry and increase said clock frequency during low computational loads encountered by said core circuitry.

* * * * *